June 15, 1937.  H. GELLER  2,083,991
ADJUSTABLE CURTAIN
Filed Aug. 27, 1934  12 Sheets-Sheet 1
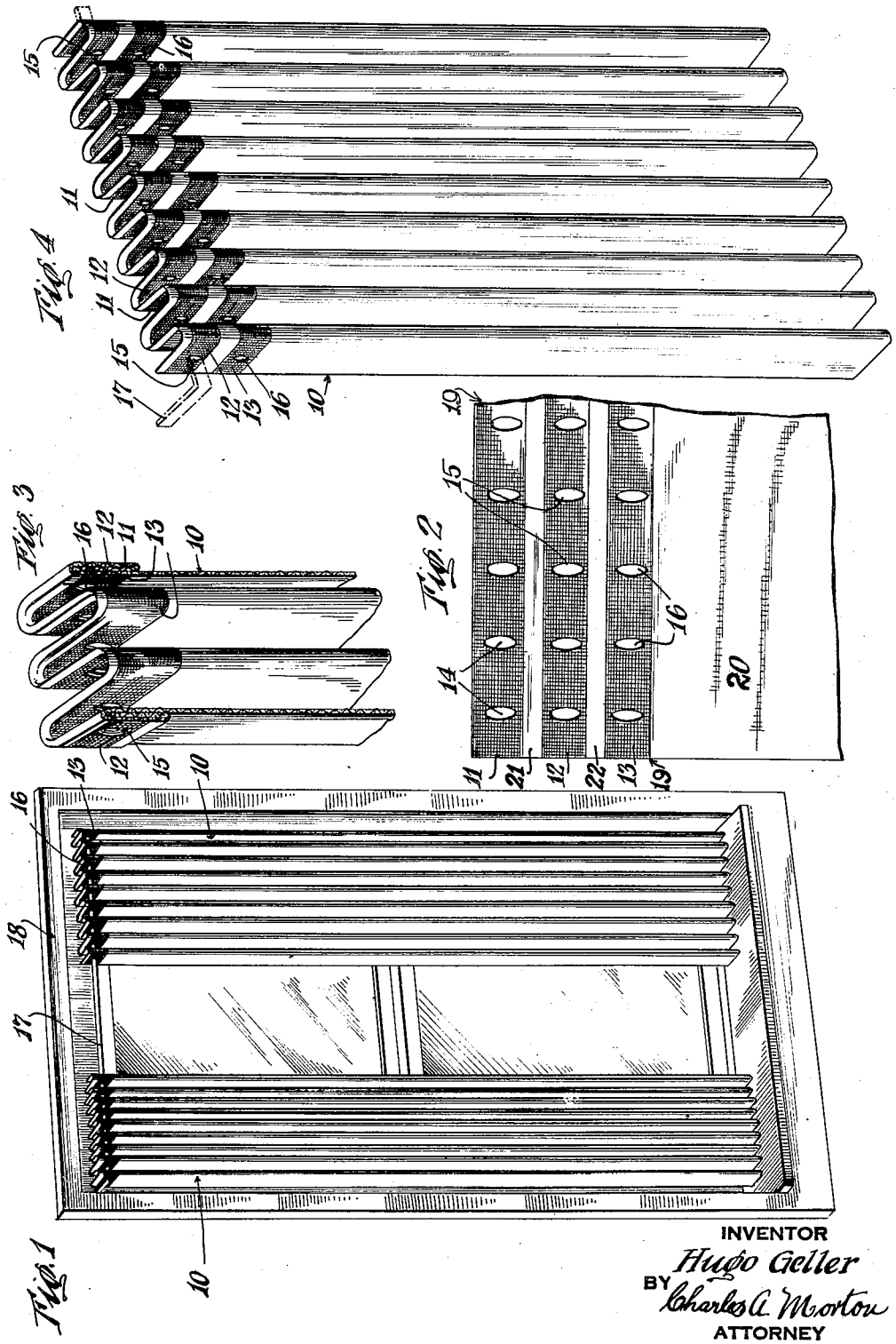

June 15, 1937. H. GELLER 2,083,991
ADJUSTABLE CURTAIN
Filed Aug. 27, 1934 12 Sheets-Sheet 2
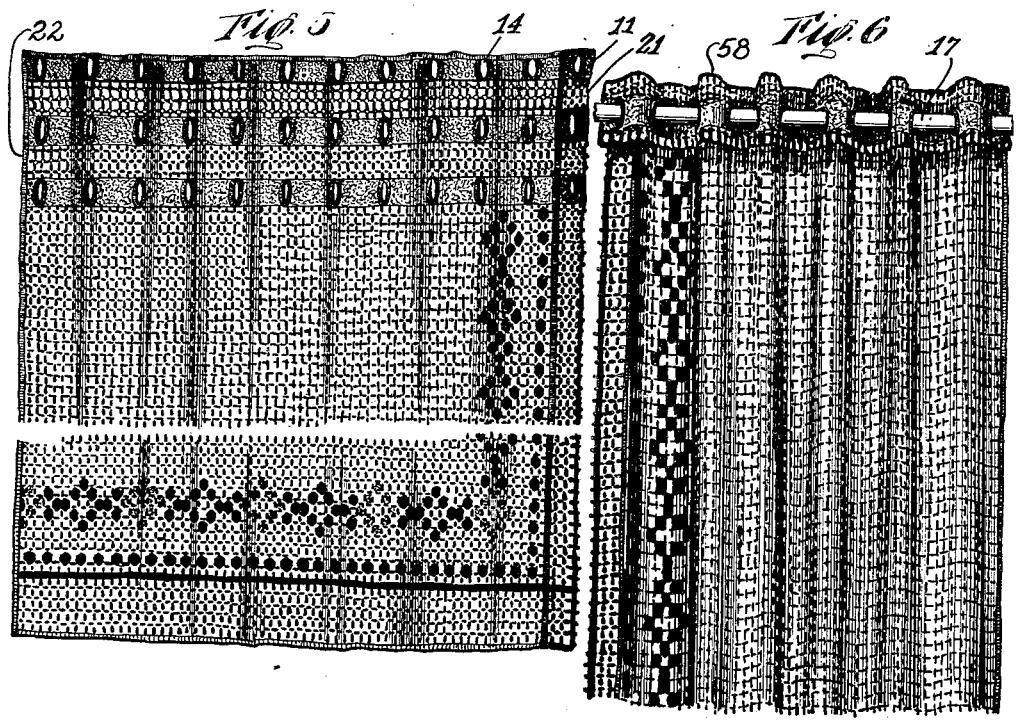
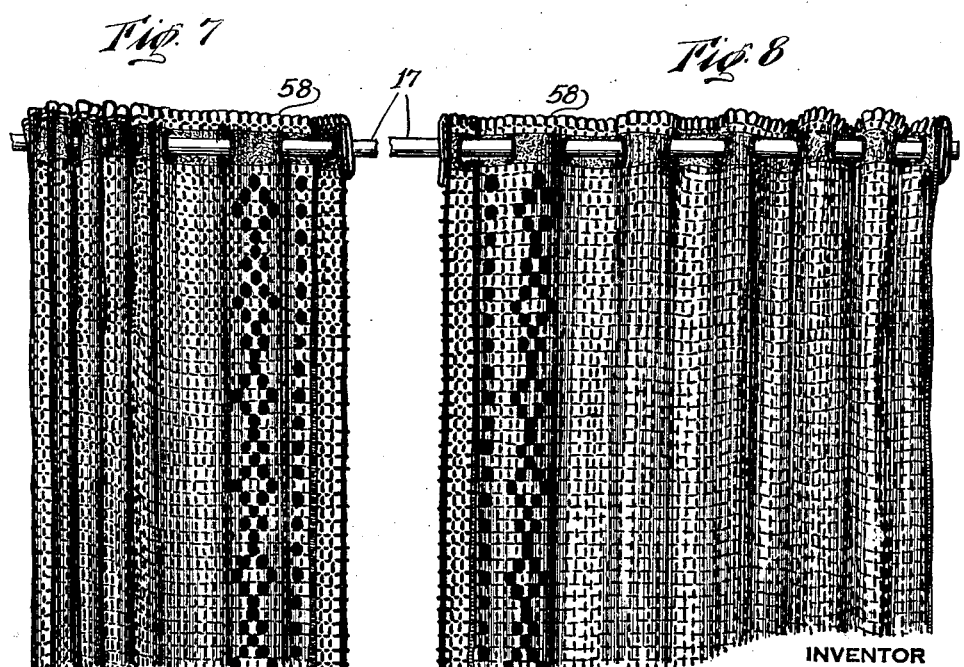
INVENTOR
Hugo Geller
BY Charles A. Morton
ATTORNEY June 15, 1937.  H. GELLER  2,083,991
ADJUSTABLE CURTAIN
Filed Aug. 27, 1934    12 Sheets-Sheet 3
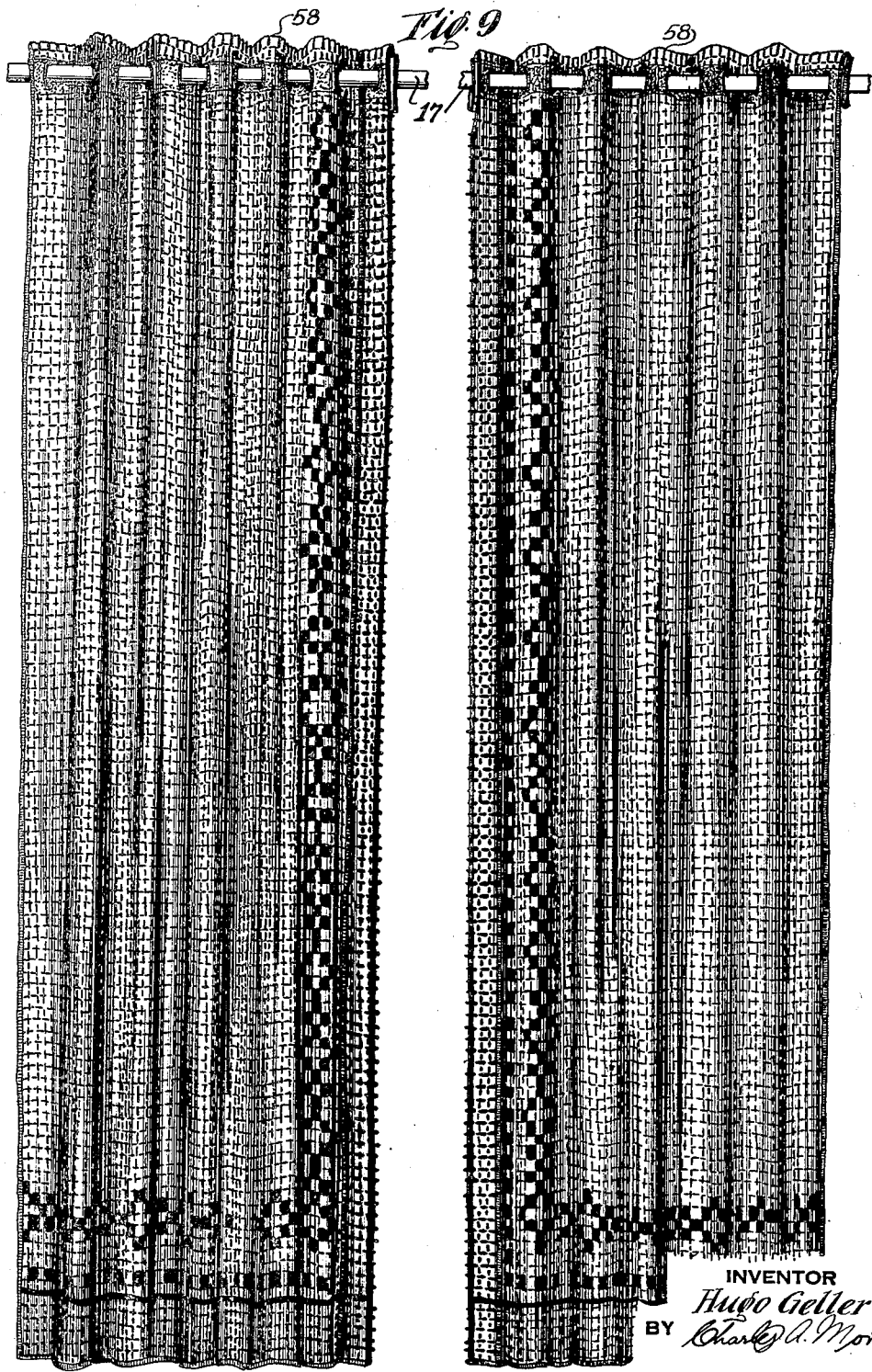

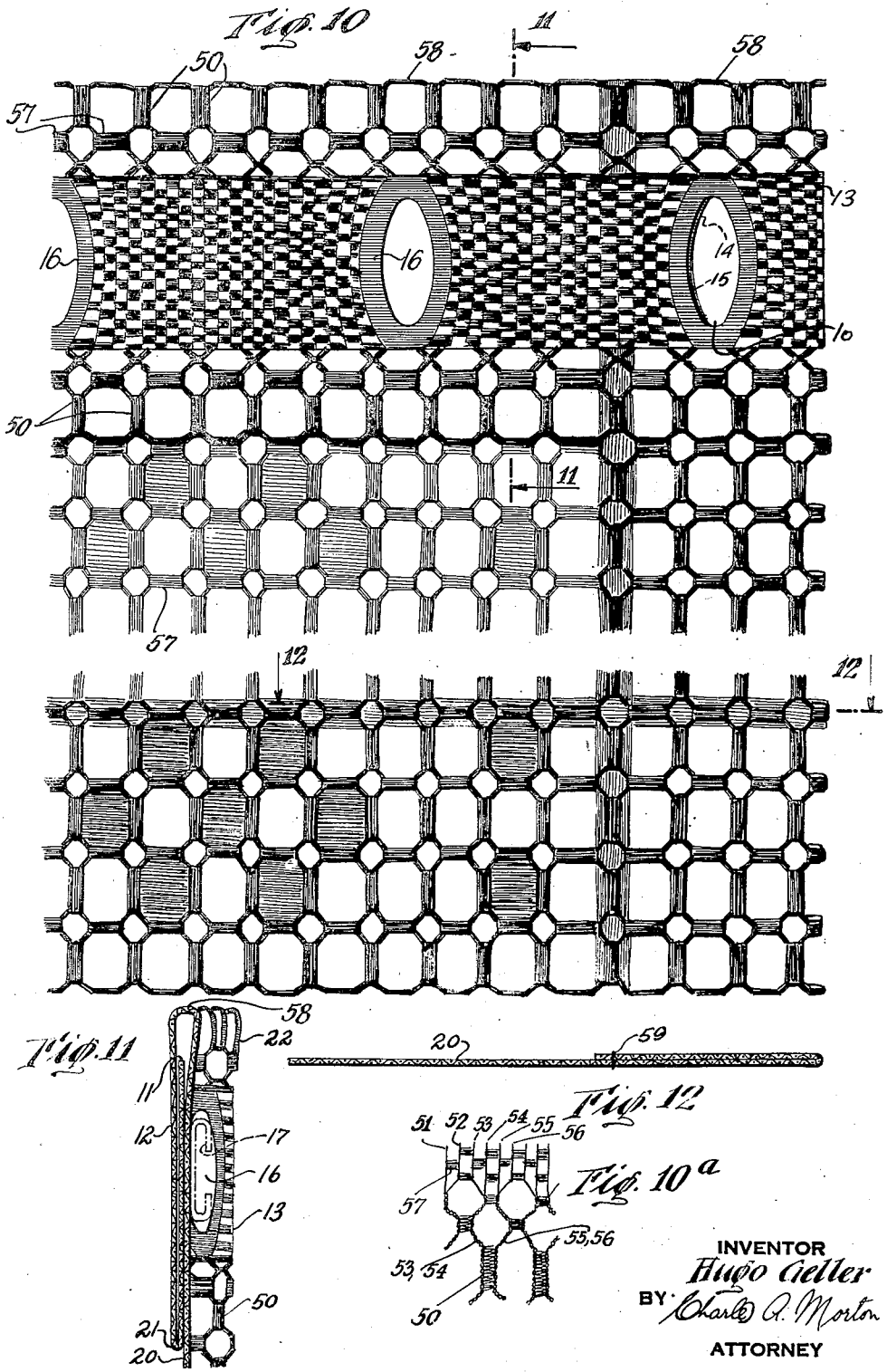

June 15, 1937.  H. GELLER  2,083,991
ADJUSTABLE CURTAIN
Filed Aug. 27, 1934   12 Sheets-Sheet 5
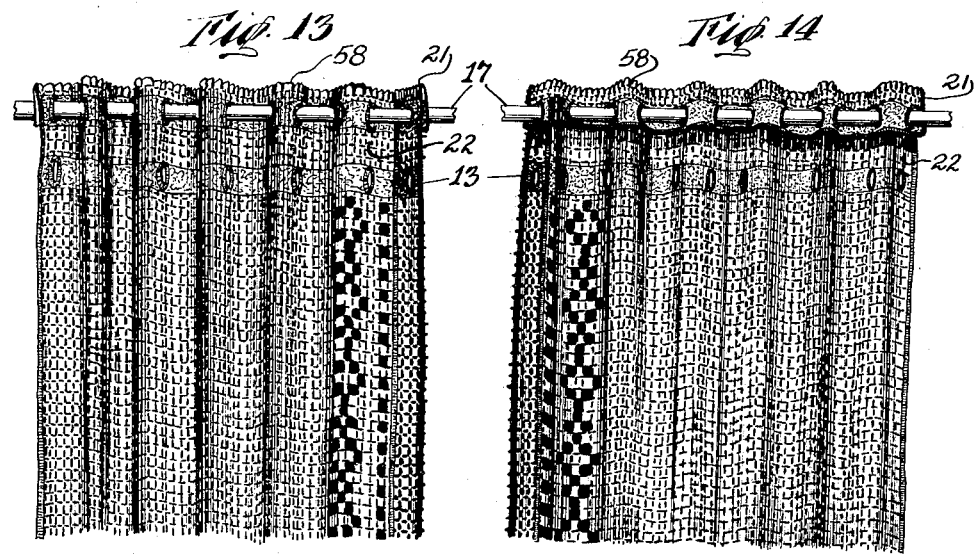
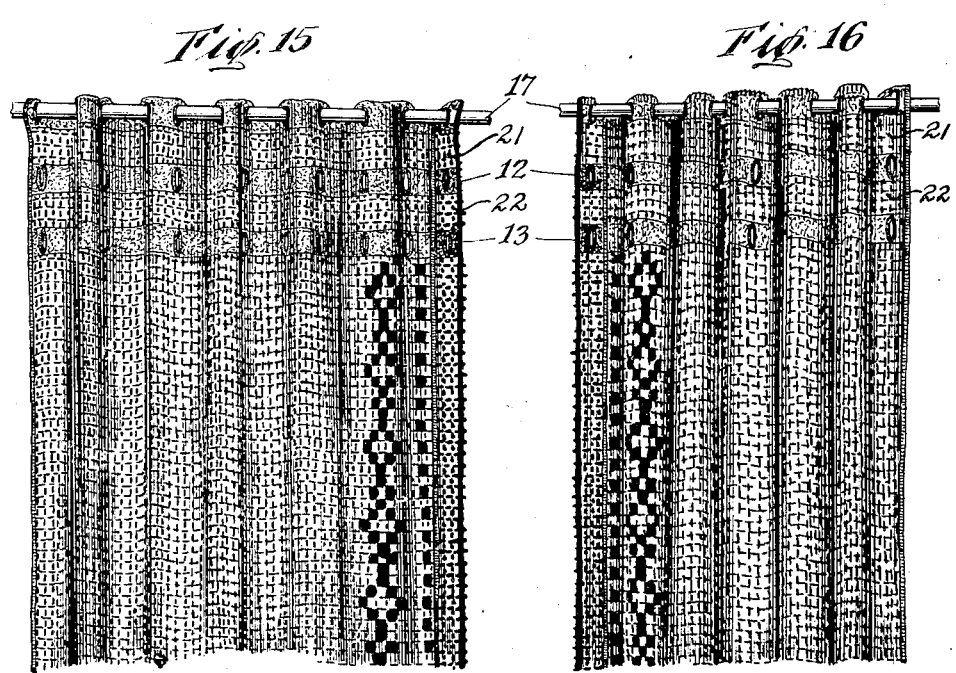
INVENTOR
Hugo Geller
BY Charles A. Morton
ATTORNEY June 15, 1937. H. GELLER 2,083,991
ADJUSTABLE CURTAIN
Filed Aug. 27, 1934 12 Sheets-Sheet 6
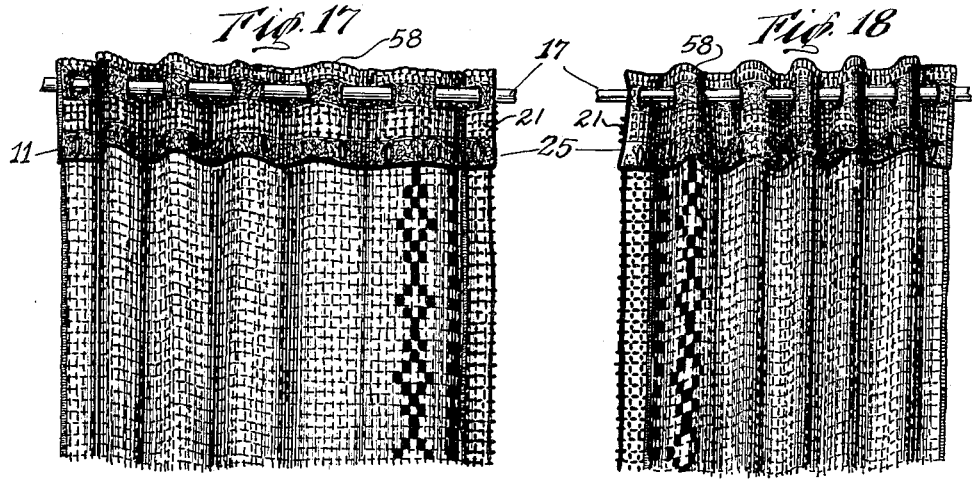
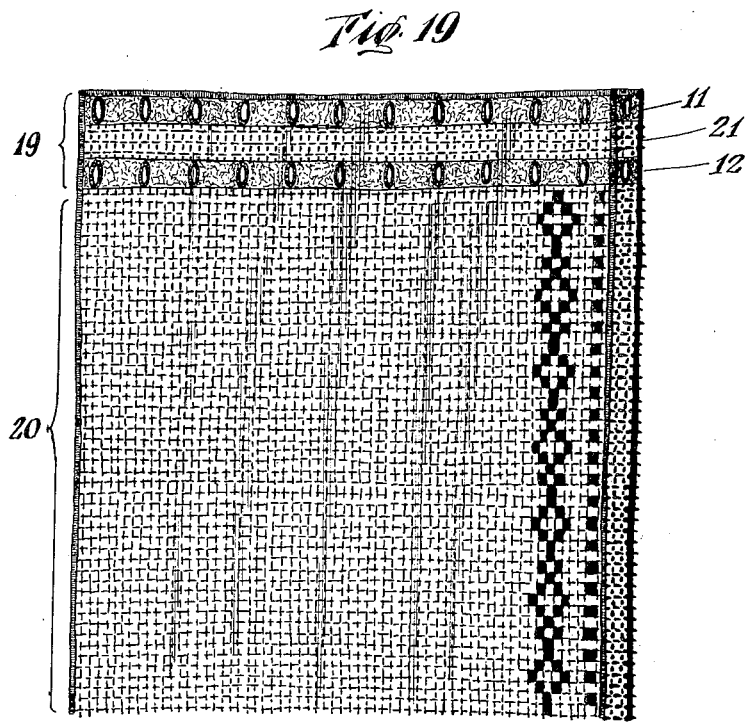
INVENTOR
Hugo Geller
BY Charles A. Morton
ATTORNEY

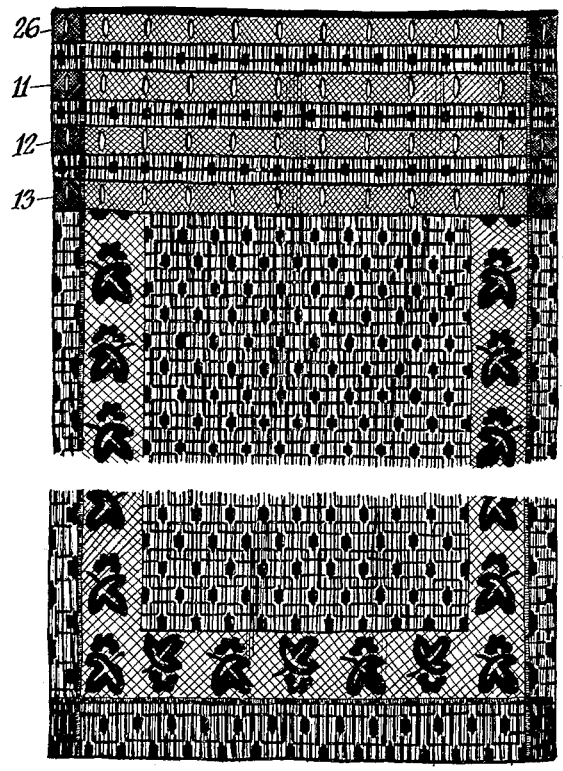

June 15, 1937. H. GELLER 2,083,991
ADJUSTABLE CURTAIN
Filed Aug. 27, 1934 12 Sheets-Sheet 8
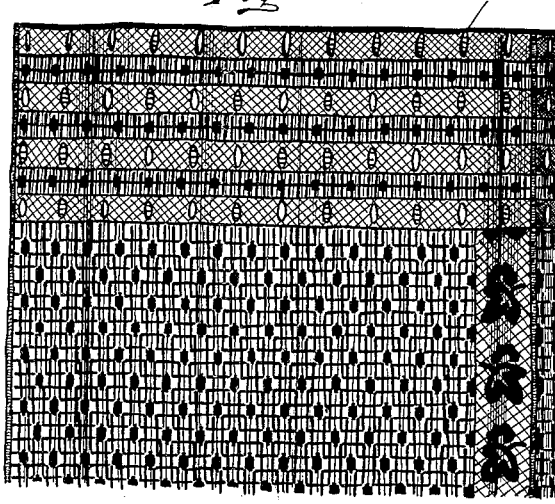
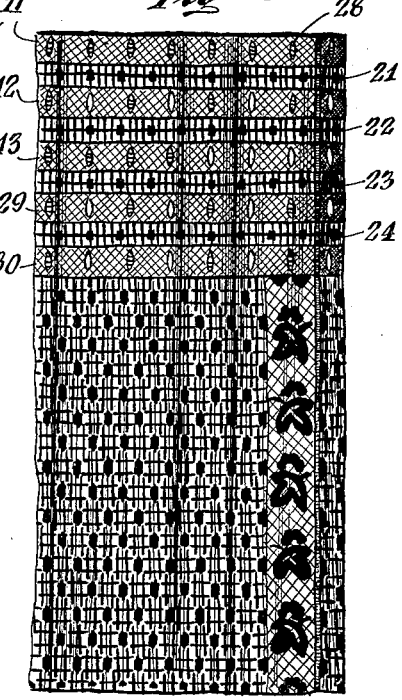
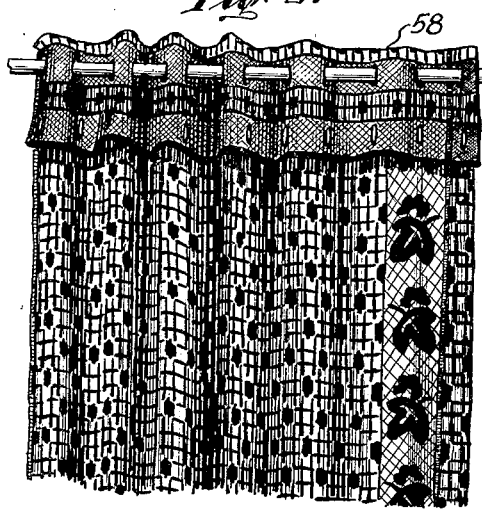
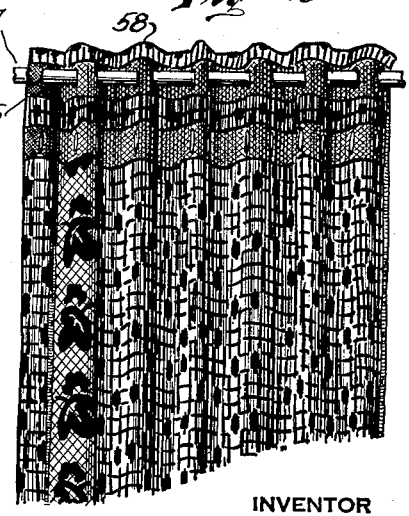
INVENTOR
Hugo Geller
BY
Charles A. Norton
ATTORNEY

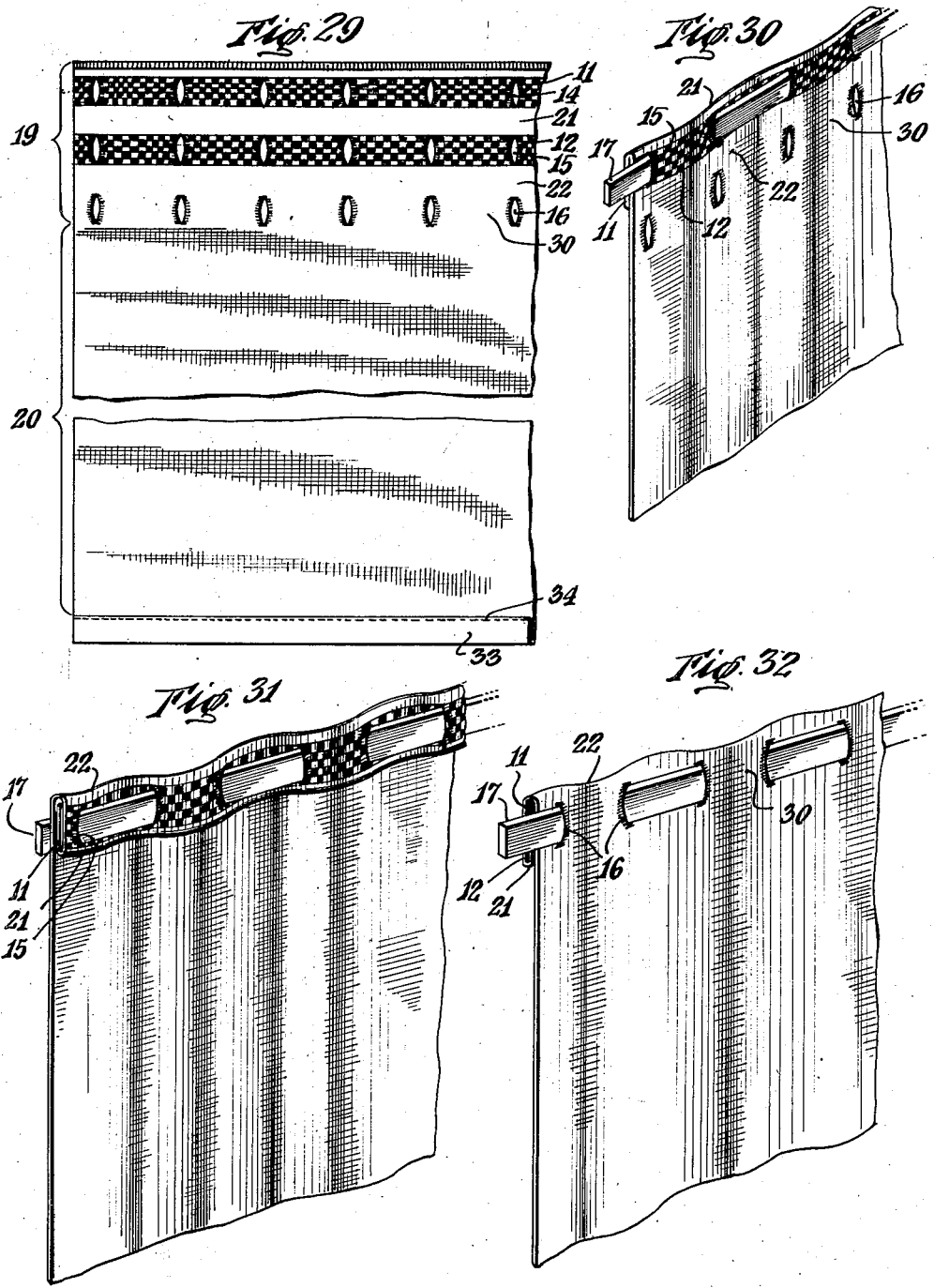

June 15, 1937.  H. GELLER  2,083,991
ADJUSTABLE CURTAIN
Filed Aug. 27, 1934  12 Sheets-Sheet 10
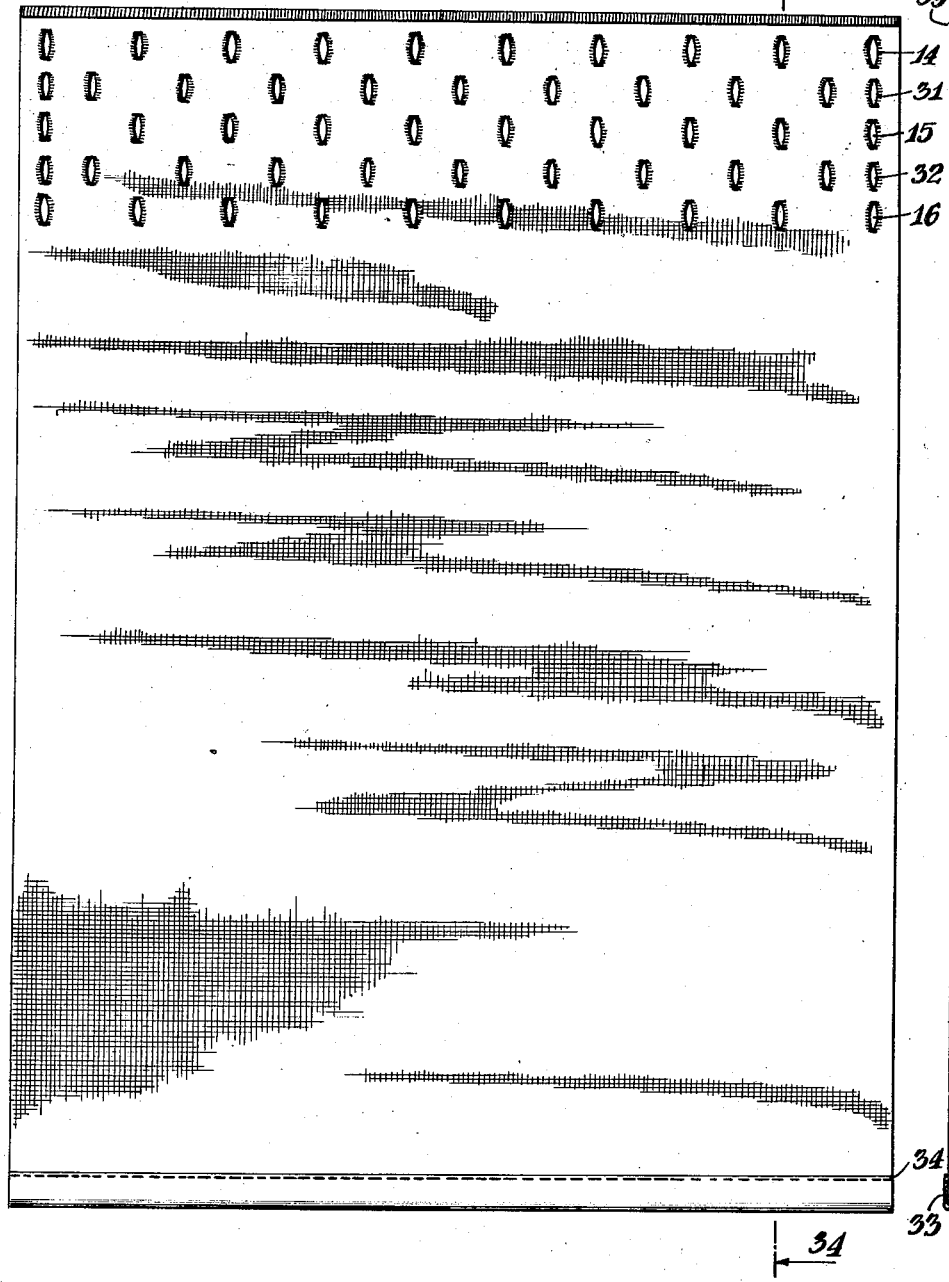
INVENTOR
*Hugo Geller*
BY
ATTORNEY

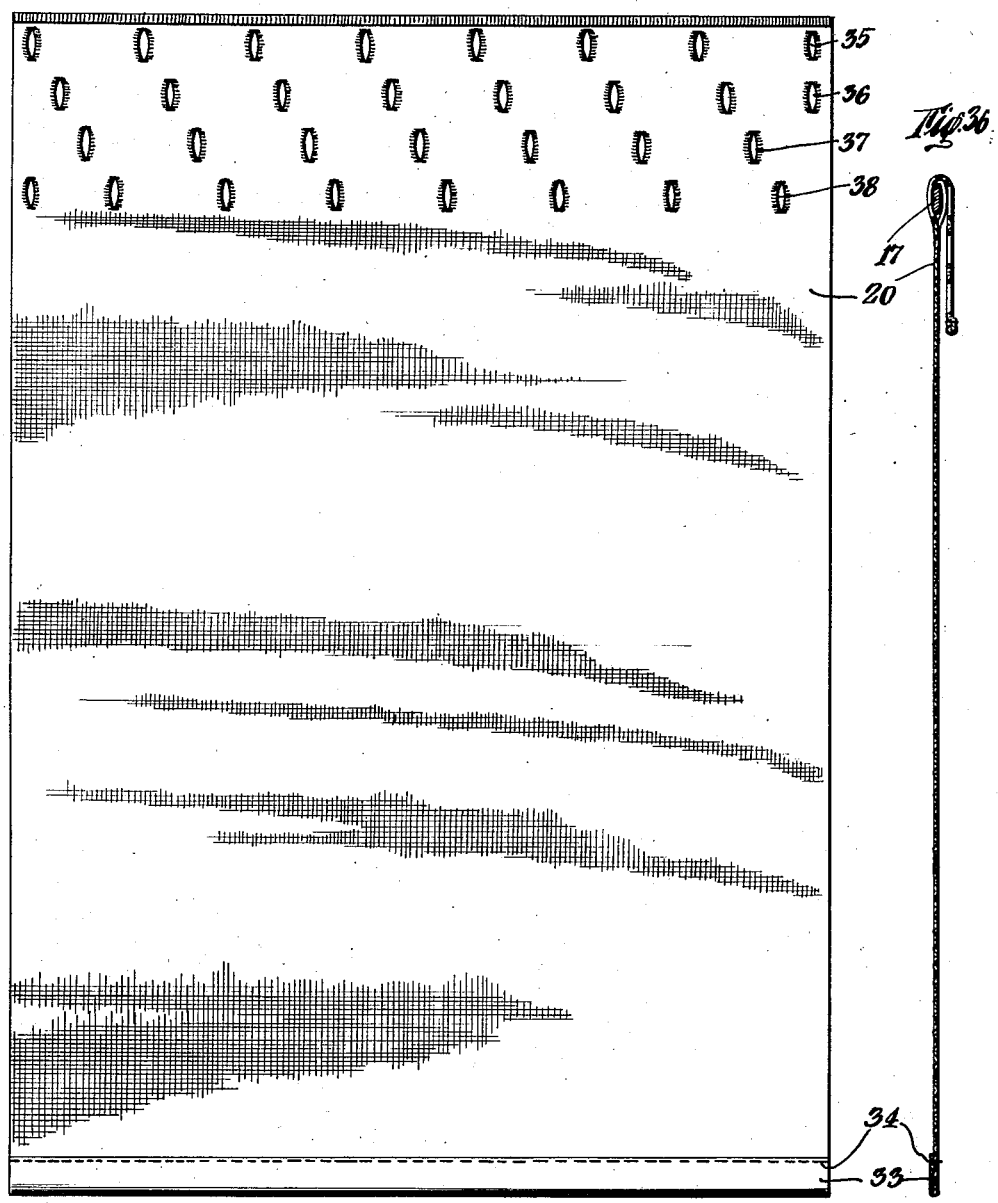

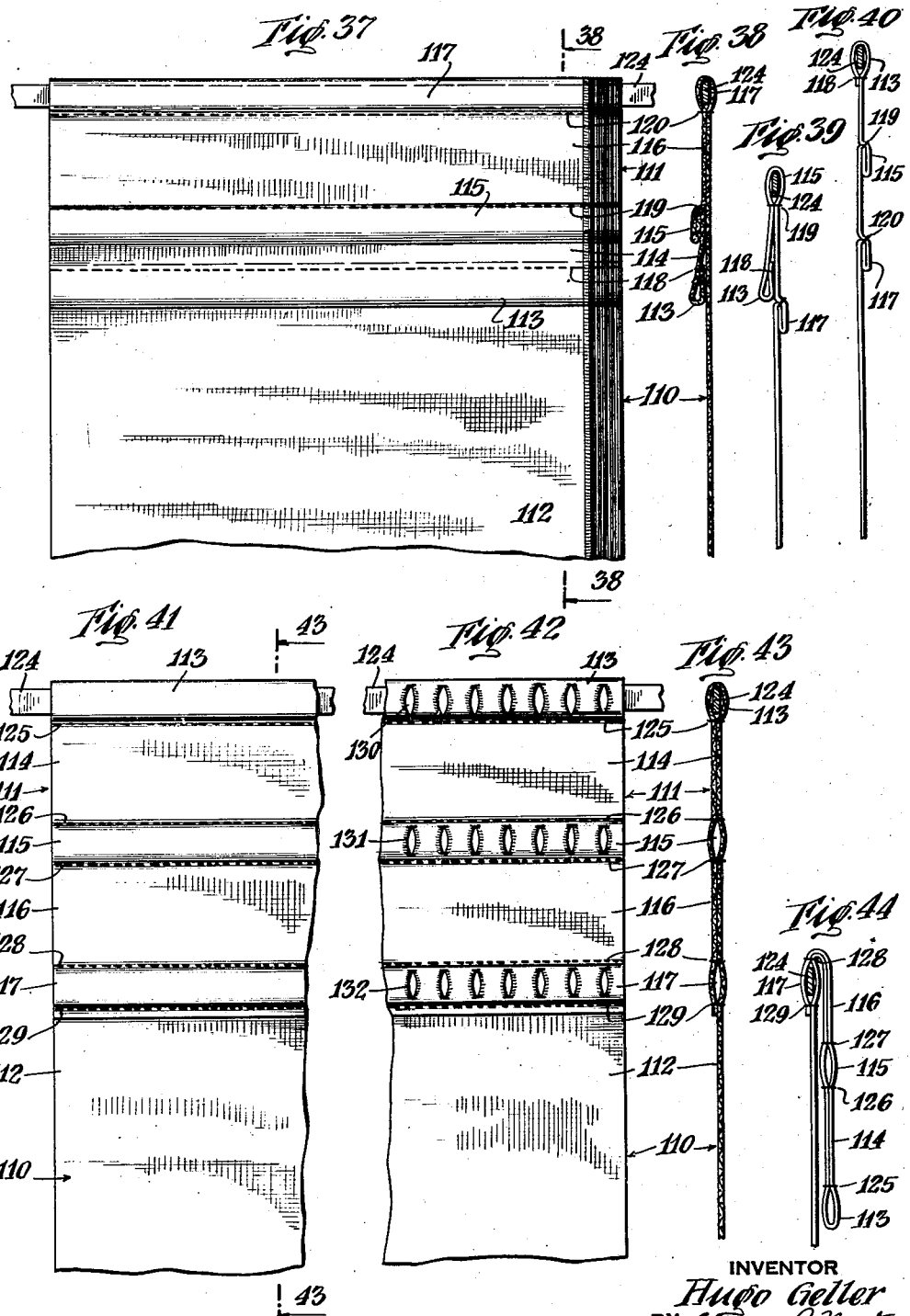

Patented June 15, 1937

2,083,991

UNITED STATES PATENT OFFICE 2,083,991

ADJUSTABLE CURTAIN

Hugo Geller, New York, N. Y., assignor to Patchogue-Plymouth Mills Corporation, New York, N. Y., a corporation of New York Application August 27, 1934, Serial No. 741,614

13 Claims. (Cl. 156—10)

This invention relates to adjustable curtains.

One object of this invention is a method of making adjustable ready-to-hang curtains.

Another object is a ready-to-hang adjustable curtain of lace or the like.

Another object is the prolongation of the useful life of the curtain by automatically compensating for shrinkage in laundering.

Another object is a curtain adapted for use at windows of different lengths.

Another object is a ready-to-hang curtain having a surplus of textile fabric which may be utilized to extend the curtain, and when not so utilized conserved for future use in such manner as to enhance the aesthetic or ornamental appearance of the hung curtain.

Other objects are economy of time and labor.

According to this invention, the curtain is made appreciably longer than the corresponding conventional curtain formerly used for any given size window, so that the curtain top constitutes in effect an extension of the corresponding conventional curtain throughout its width; and a plurality of rows of horizontal rod-engaging passageways are fashioned in the said curtain top or extension, said passageways which are large enough to allow the free passage of a conventional adjustable curtain rod may be made to simulate the appearance of ornamental bands formed in the curtain top, said curtain top or extension being of such dimensions that when one of the rod-engaging passageways other than the top one is used as the line of suspension for the curtain rod, the surplus fabric which is not utilized to extend the body portion of the curtain is conserved in the form of an ornamental cuff or valence. The rod-engaging passageways are preferably spaced apart at a distance therebetween generally representing the amount of shrinkage in laundering, so that when the curtain is re-hung after laundering it may be suspended from another rod-engaging passageway constituting a new line of suspension so as to display approximately the same length of curtain down hanging from the suspension rod as before.

In the drawings comprising twelve sheets of forty-four figures numbered Figs. 1 to 44 inclusive certain embodiments of the invention are set forth.

Fig. 1 is a front elevation of a pair of curtains embodying the invention suspended from a conventional curtain rod;

Fig. 2 is a view of a portion of a curtain top showing the construction in greater detail;

Fig. 3 is a detailed view of a portion of a curtain top folded preparatory to the insertion of the curtain rod;

Fig. 4 is a perspective view of a modified method of hanging the curtain;

Fig. 5 is a plan view of a lace curtain embodying the invention, said curtain being partly broken away;

Fig. 6 is a detailed view showing the upper portion of the curtain suspended to effect minimum length adjustment with the surplus fabric ornamentally conserved and displayed in front;

Figs. 7 and 8 illustrate the ornamental appearance of the curtain of Fig. 6 as viewed from the opposite side thereof; Fig. 7 illustrating the ornamental appearance of said curtain when close pleated and Fig. 8 the ornamental appearance of said curtain when more fully extended;

Fig. 9 is a front view of a pair of curtains adjusted to minimum length with the conserved surplus fabric concealed from the observer;

Fig. 10 is a detailed view of a portion of a folded top showing the folded plies in optical registry;

Fig. 10a is a view of a detail;

Fig. 11 is a vertical sectional view taken along the line 11—11 of Fig. 10 looking in the direction of the arrows;

Fig. 12 is a horizontal section taken along the line 12—12 of Fig. 10 looking in the direction of the arrows;

Figs. 13 and 14 are detailed views of the upper portion of one of the curtains of Fig. 9 when suspended to effect intermediate length adjustment; said figures respectively illustrating the ornamental appearance of said curtain with the conserved surplus fabric concealed behind the curtain wall and ornamentally exposed to view;

Figs. 15 and 16 are front views of the upper portion of one of the curtains of Fig. 9 when suspended to effect maximum length adjustment; Fig. 15 showing the upper portion of the curtain in extended form and Fig. 16 the said upper portion more closely pleated;

Figs. 17 and 18 are front views of the upper portion of one of the curtains of Fig. 9 when suspended to effect minimum length adjustment with the surplus fabric conserved and displayed as a down hanging ornamental valance; Fig. 17 showing the said upper portion in extended form, and Fig. 18 the said upper portion more closely pleated;

Fig. 19 is a plan view of the upper half of a curtain embodying the invention but provided with two rod-engaging passageways only;

Fig. 20 is a plan view of a curtain partly broken away having four rod-engaging passageways;

Fig. 21 is a plan view of a portion of the curtain of Fig. 20 modified to combine the two uppermost eyelet passageways to form a hemmed passageway;

Fig. 22 is a vertical sectional view taken along the line 22—22 of Fig. 21;

Fig. 23 is a front view of the upper portion of the curtain of Fig. 21 when suspended to effect minimum length adjustment with the surplus fabric down hanging in the form of an ornamental valance;

Fig. 24 is a front view of the upper portion of the curtain of Fig. 21 when suspended by the hem to effect maximum length adjustment;

Fig. 25 is a plan view partly broken away of a curtain having four rod-engaging passageways showing how the eyelets may be closed with cross threads;

Fig. 26 is a front view of a fragment of the upper portion of a curtain having five rod-engaging passageways;

Fig. 27 is a front view of the curtain of Fig. 25 suspended to effect intermediate length adjustment with the surplus fabric exposed in the form of a valance;

Fig. 28 is a rear view of the curtain of Fig. 27;

Fig. 29 is a plan view partly broken away of a modified form of curtain;

Figs. 30, 31 and 32 are perspective views of a fragment of the upper portion of the curtain of Fig. 29 hung in as many different ways;

Fig. 33 is a plan view of another modified form of curtain;

Fig. 34 is a vertical section thereof taken along the line 34—34 of Fig. 33;

Fig. 35 is a plan view of another modified form;

Fig. 36 is an end view of the curtain of Fig. 35 when suspended to effect minimum length adjustment;

Fig. 37 is a front view of the upper portion of a curtain showing how the invention may be applied to woven textile fabrics particularly fabrics other than laces;

Fig. 38 is a vertical sectional view of the curtain of Fig. 37 taken along the line 38—38 of said figure looking in the direction of the arrows;

Figs. 39 and 40 are end views of the curtain of Fig. 37 when hung to effect intermediate and maximum length adjustments respectively;

Fig. 41 is a front view of the upper portion of another modified form;

Fig. 42 is a front view of the upper portion of another modification;

Fig. 43 is a vertical sectional view of the curtain of Fig. 41 taken along the line 43—43 of Fig. 41 looking in the direction of the arrows; and Fig. 44 is an end view of the curtain of Fig. 41 when hung to effect minimum length adjustment.

Like reference characters designate corresponding parts throughout the several figures of the drawings.

Referring to the drawings any desired portion of the window frame 18 (Fig. 1) may be curtained as fashion may dictate, but for purposes of the specification it will be assumed that window frame 18 is six feet in height, and that only sill length curtains are used. The curtain rod 17 may be of any preferred type, as for example the C shaped two piece adjustable metal curtain rod now in common use. For a six foot window and using sill length curtains, each of the curtains 10 will consist of a body portion 20, two yards in length, and a top portion 19, approximately 9 inches in length giving the curtain an overall length of two and one quarter yards. The extra one-quarter yard forms in effect an extension or curtain top at the upper end of the curtain, which may be utilized to extend the body portion 20, and when not so used said top portion 19 is surplus fabric which must be conserved for future use without detracting from the ornamental appearance of the curtain in hung position. The top portion 19 is provided with a plurality of rows of eyelets 14—14, 15—15, and 16—16, the eyelets being arranged in parallel horizontal rows constituting rod-engaging passageways, corresponding eyelets in each row being vertically aligned. The openings of eyelets 14—14, 15—15, and 16—16, are sufficiently large to permit free passage of curtain rod 17. With a C shaped metal curtain rod the openings are preferably elongated to conform to the contour of the rod. Eyelet passageway 16 constitutes the normal line of suspension for the curtain 10, eyelet passageways 15 and 14 being provided to effect length adjustment of body portion 20, should such adjustment be necessary or desirable. The panel 21 between the rod-engaging eyelet passageways 14 and 15, and panel 22 between rod-engaging eyelet passageways 15 and 16, are sufficiently long to compensate for shrinkage of body portion 20 in washing, so that after shrinkage in laundering, the length of the curtain measured from eyelet passageway 15 to the bottom of the body portion, is approximately the same as the length of the curtain measured from eyelet passageway 16 to the bottom of the body portion when the curtain was new. The arrangement is such that the horizontal rows of eyelets are vertically spaced a sufficient distance apart so that when the top portion 19 is folded upon itself once (Figs. 4, 17, 18), or twice (Figs. 1 and 3), to bring vertically aligned eyelets 14—14 and 15—15 (Fig. 4), 15—15 and 16—16 (Figs. 17 and 18), or 14—14, 15—15, and 16—16 (Figs. 1, 6, 7, 8, 9), in cooperative registry, preparatory to the insertion of the end of curtain rod 17 through said cooperatively registered eyelets, the top of the curtain forms in effect an ornamental cuff (Figs. 6 and 9), or valance (Figs. 17 and 18) having a plurality of pleats in sinusoidal (wave) form therein. As the horizontal rows of eyelets 14—14, 15—15, 16—16 and the top and bottom of each curtain 10 are in parallel alignment, and the vertical rows of eyelets 14, 15, 16 and the side edges of each curtain 10 are also in parallel alignment, and the metal curtain rod 17 is rigid (sagless) and mounted level, the sinusoidally formed pleats will extend vertically throughout the entire length of each curtain presenting the aesthetic effect substantially as disclosed for example in Figs. 1, 6, 9, and 17 of the drawing.

The invention is particularly applicable to lace curtains made on a Nottingham lace curtain machine or the like, in which case the eyelets 14, 15 and 16 are woven in the fabric and form part of the pattern. The eyelets may be fabricated in a network of finer and contrasting weave or pattern such as the bands 11, 12 and 13 (Fig. 2); see also Figs. 5, 20 and 29. When coarse open nets, such as combination weaves and the like, are employed, the net is changed from coarse to fine by separating the groups of pillared warp threads 53, 54, 55, 56 (Fig. 10a) forming the pillars 50, into a series of more finely spaced warp threads (compare Figs. 10 and 10a illustrating one of the bands 11, 12, 13 woven in the well known checker pattern). These bands of close network materially strengthen the curtain along the line of suspension thereby reducing the risk of tearing. By using bands 11, 12, 13, of contrasting color or weave, the ornamental appearance of the curtain is greatly enhanced particularly when the curtain is hung or draped (see Figs. 5, 10, 19, 20, 25, 29; and Figs. 6, 9, 13 to 18, 27, 28, and 30 to 32).

Although in Figs. 10 and 10a, only a fragment of a band and of a spacing or panel is shown to illustrate the manner of changing from the coarse to the fine network, it should be understood that the networks may be repeated, by alternating between a fine mesh for each band 11, 12, 13, and a coarse mesh for each spacing or panel 21, 22 (see Figs. 5 and 19).

The edges of the curtain are finished in any suitable manner to prevent unraveling, as by hemming (see Fig. 5), but where this is done by hemming, it is desirable to fold the fabric to bring the pattern in the folded plies into optical registry. The lower hem 33 (Figs. 29, 34) is preferably of sufficient depth to impart weight to the curtain bottom, the double ply in the formed hem and the added weight thus given, tending to retain the folds in the curtain body and to maintain said body portion straight. The top edge may be finished with a small hem 39 (Fig. 33); and the side edge may be folded with the pattern in the folded plies in optical registry, with the eyelets in the formed hem preferably substantially centrally disposed (compare Fig. 10 and Fig. 12). When hemming is provided to prevent unravelling, the folded plies forming the top, bottom and side hems may be secured in any preferred manner as by lines of stitching, the top hem 39 (Fig. 34) and the bottom hem 33 (Figs. 29 and 34) by horizontal lines of stitching as shown; see for example bottom hem 33 (Figs. 29 and 33) secured by line of stitching 34. The side hem (Fig. 12) may similarly be secured by the vertically disposed line of stitching 59. To avoid unsightly sagging of the draped curtain, it is desirable to extend the supporting points as near to the side edges as possible, and this is effected by locating the first vertical row of eyelets relatively close to said side edges (see Figs. 5, 10 and 19 to 21).

The pattern including the eyelets 14, 15, 16 is so proportioned, that when the top portion 19 is folded horizontally to bring said eyelets into cooperative registry, the pattern in the folded plies is in optical registry, and the weave is preferably designed so that the line of fold between plies will fall upon closed rather than open structure, as upon a line of clothing 57 (Fig. 10), to present an unbroken line or wall of thread 58 (Fig. 10) across the folded curtain top. (Compare Figs. 9, 10 and 11). The uppermost row of eyelets 14, should be relatively close to the extreme upper edge of the curtain, so that when the curtain is supported from the top row of eyelets only (Figs. 15 and 16), the edge band above the curtain rod will be erect and self-supporting, and not fall over and hang down to impair the ornamental effect. The folded-in top edge should also be narrow enough not to interfere with the proper folding of the other plies (see Fig. 11), although in some fabrics it may be long enough to serve as a foundation or lateral support for the folded edge 58 (see Fig. 3).

Where the curtains are to be employed as panels both side edges may be hemmed wide (Fig. 12), but where used as pair goods outer edges may be a narrow hem or merely a selvage edge (Fig. 9).

The curtains are made in standard sizes, longer by the length of the curtain top 19 (Figs. 2, 19, 29) than the conventional curtain of the prior art. The curtain top 19 is designed so that it can be used to extend the body portion 20 (see Figs. 15 and 16), but when not so used the length of top 19, and the spacing of the eyelet passageways, is such, that said top portion may be used to simulate a valance (Figs. 17 and 18), or folded by one or more plies to form an ornamental cuff or heading (Figs. 6 to 9, 13, 14, and 30 to 32). The length of the curtain top will also depend upon the desired width of the cuff or depth of the valance, and the number of eyelet passageways to be provided for adjusting purposes. In general three passageways are sufficient, although the number of eyelet passageways may be varied if desired to meet particular conditions. The curtain may have but two passageways (Fig. 19) or it may have four such passageways (Fig. 25) or even more (Fig. 26). In general each additional passageway increases the range of adjustability of the curtain approximately three inches. The depth of the desired cuff or of the valance also affects the depth of the top 19, and the size of the cuff or valance will in turn depend upon the size of the curtain rod 17, which in turn depends upon the size of the window opening. With a window six feet high and three to four feet wide, and using an adjustable C shaped curtain rod, a cuff three inches deep given an attractive ornamental effect, and experience shows that three rows of eyelets are ordinarily sufficient to compensate for shrinkage, so that a curtain top nine inches long on a body portion two yards long, making the curtain two and one-quarter yards overall, allows a satisfactory margin for adjustment purposes.

The curtains whether pairs or panels are preferably substantially wider than the width of the area each is intended to cover and the extra width is utilized to form sinuous pleats (Figs. 4 and 9). The eyelets 14, 15, 16, are large enough to allow the curtain to be freely slidably supported upon the rod, whereby various ornamental effects can be obtained. Figs. 7 and 8 show the same curtain adjusted to different widths. Compare also Figs. 15 and 16, and Figs. 17 and 18. Where the top portion 19 is made up of an exact repeat of the pattern, the curtain is fully reversible without any appreciable change in ornamentation. Figs. 6 and 9 show the same curtain viewed from opposite sides with a triple ply cuff or heading. Figs. 13 and 14 show the same curtain as Figs. 6 and 9, but with a twin ply cuff or heading (formed by bringing eyelets 14 and 15 only into cooperative registry) viewed from opposite sides. Figs. 17 and 18 show the curtain of Fig. 9, but with a valance effect (formed by bringing eyelets 15 and 16 only into cooperative registry.) It thus appears, that disregarding width adjustment entirely, a curtain like that shown in Fig. 5, may be draped in six different ways as shown in Figs. 6, 9, 13, 14, 16 and 18 respectively, and by varying the widths of the draped curtains, the ornamental effects can be endlessly multiplied.

By omitting the ornamental band like effect from the eyelet passageway 16 (Fig. 29), different ornamental effects can be obtained when the draped curtain is viewed from opposite sides (compare Figs. 31 and 32). When said curtain is draped to effect intermediate length adjustment (Fig. 30), so that the eyelet passageway 16 is used to extend the body portion 20 (Fig. 29), the omission of band 13, changes the ornamental effect (compare Figs. 14 and 30).

The curtain may be made with but two eyelet passageways (Fig. 19), with four eyelet passageways (Fig. 20), or with five (or more) eyelet passageways (Fig. 26). In some cases the eyelets in one (or more) horizontal rows may be provided with cross threads 28 (Figs. 25 and 26) to close the openings until the same are needed, at which time the cross threads 28 may be cut with a pair of scissors without causing unraveling of the edge of the eyelets. This construction may be used to good advantage for the uppermost row of eyelets 11, where the curtain is intended to be folded so as to form a valance 25 (Fig. 27) when suspended in accordance with the normal line of suspension, to effect minimum length adjustment.

Fig. 33 shows a modification having a plurality of rows of eyelets 14, 15, or 14, 15, 16, in alignment as before, and a plurality of additional rows of vertically aligned eyelets 31 and 32, positioned in staggered relation relative to eyelets 14, 15 and 16. The first and last eyelet in each row are preferably disposed relatively close to the side edges of the curtain. In the curtain as shown in Fig. 33, the rows of eyelets 14, 15 and 16 are spaced at substantially the same distance as in the curtain shown in Fig. 5, the rows of eyelets 31 and 32 being woven therebetween. Such a construction provides for lengthening or shortening the curtain by one-half adjustments. It should be understood that the spacings between the rows of eyelets 14, 13, 15, 32 and 16 (Fig. 33) may be the same as the spacings 21 or 22 (Figs. 2, 5, 19, 26), thereby effecting full adjustments.

Fig. 35 shows a modification wherein the several rows of eyelets 35, 36, 37, 38 are all located in staggered relation relative to each other, so that none of said rows of eyelets are vertically aligned. The eyelet passageways are positioned at suitable distances to compensate for shrinkage as in laundering as before. Fig. 36 is an end view of the curtain of Fig. 35, hung to effect minimum length adjustment, the surplus fabric in the top portion being displayed in front in the form of a valance. As the line of suspension is changed, varying sections of the top portion are in effect transferred to the body portion, that portion of the top portion above the line of suspension constituting surplus fabric to be ornamentally disposed of in the form of a valance.

Figs. 20 to 24 illustrate how a curtain having a fourth eyelet passageway 26 (Fig. 20) can be provided with a combination hem and eyelet rod-engaging passageway 27 (Fig. 21) by folding the curtain to bring eyelets 26 and 11 into cooperative registry and securing the folded plies together by a line of stitches to form a hem (Fig. 22). This curtain cannot only be draped in any of the six ways heretofore described, but can also be suspended as a ready-to-hang hemmed curtain (Fig. 24). Hem 27 tends to further reinforce the cuff or heading (Fig. 9, 14 or 15), and to weight down the valance (Fig. 23) when used, thus holding it in place. Cross threads 28 (Fig. 24) may also be used to close up the eyelets in one or more eyelet passageways as previously described.

The use of hemmed passageways having rows of eyelets passing through both plies of the hemmed fabric may be extended to include two or more such combination hem and eyelet passageways 27 (Figs. 21–24). Fig. 42, illustrates how this construction can be extended to a curtain 110 having a top portion 111 provided with two plies of fabric folded back as indicated in cross section in Fig. 43, the hems 113, 115 and 117, being formed by the lines of stitches 125, 126, 127, 128, 129; there being rows of eyelets 130 through both plies of hem 113, rows of eyelets 131 through both plies of hem 115, and rows of eyelets 132 through both plies of hem 117. The hems 113, 115, 117, and the eyelet passageways formed by the twin rows of cooperative registering eyelets 130, 131 and 132, are spaced apart at a distance representing generally the shrinkage due to laundering to provide a triple-adjustment ready-to-hang curtain as before. The eyelets 130, 131 and 132 are large enough to freely slidably receive the curtain rod 124, which like rod 17, may be the conventional C shaped curtain rod now in vogue. This construction increases the variety of ornamental effects which may be produced with the curtain, it being understood that while no particular ornamental fabric is indicated either in the curtain body 112 or the top portion 111, any desired ornamental lace can be employed. It should also be understood that the curtain shown in Fig. 42, like those shown in Figs. 37 and 41, may be made of any textile fabric other than curtain lace if desired.

In the construction shown in Fig. 37, the curtain 110 is provided with a body portion 112 and a top portion 111. The rod-engaging passageways 113, 115 and 117 are made by folding the fabric to form pleats or loops (as best shown in the end view Fig. 40), and securing said pleats with lines of stitches 118, 119 and 120 respectively to form the hemmed rod-engaging passageways 113, 115, and 117. Said hemmed passageways, like the eyelet passageways heretofore described are spaced apart by means of the panels or spacings 114 and 116, to compensate generally for shrinkage in laundering. When the curtain is suspended at the normal line of suspension (Fig. 38), to effect minimum length adjustment, the top portion 111 forms a valance. When intermediate length adjustment is effected (Fig. 39), the short down hanging surplus fabric may, if preferred, be concealed behind the curtain wall, or displayed by reversing the curtain. When the body portion 112 is extended to include all of the top portion 111, to effect maximum length adjustment the curtain will present the appearance shown in end view (Fig. 40), and will not differ in eye appearance from the front view (Fig. 37) where the minimum length adjustment is illustrated.

In the construction shown in Figs. 41, 43 and 44, the body portion 112 of curtain 110, is extended by sufficient surplus fabric to form a two ply top portion 111 (Fig. 43). Hemmed passageways 113, 115 and 117 for curtain rod 124, are then formed by suitable lines of stitches 125, 126, 127, 128 and 129, traversing the width of fabric from side edge to side edge. The hemmed passageways are spaced apart by means of panels 114 and 116 at a sufficient distance to compensate generally for shrinkage in laundering. Intermediate and minimum length adjustments are obtained by passing the rod 124 through hemmed passageway 115 or 117 respectively. Fig. 44 is an end view of the curtain adjusted to minimum length, top portion 111 forming a down hanging valance as before. Maximum length adjustment is shown in section in Fig. 43.

The use of a hemmed rod-engaging passageway 113 at the top of the curtain 110 in Figs. 37, 41 and 42, provides a finished (non-raveling) top edge for the curtain.

The sides and bottom are preferably hemmed to provide reinforced finished side edges and a weighted bottom for the body portion 112. The hemmed rod-engaging passageways are made sufficiently large to freely slidably support the curtain and facilitate width adjustment thereof as by pleating (not shown), upon rod 124.

All of the foregoing constructions are made according to the same underlying method. A curtain is fabricated with a rod-engaging passageway making it ready-to-hang, but instead of finishing off the edge of the fabric at said passageway, the fabric is extended to provide a surplus of fabric to form a top portion 19 in extension of the body portion 20, and one or more additional passageways are fashioned in the fabric, in parallel spaced relation to said first passageway, the space between certain of the passageways (14, 15, 16, Fig. 2; 113, 115, 117, Fig. 41) being sufficiently large to compensate for shrinkage as in washing, so that after washing the curtain can be suspended from some passageway other than the lowest, with substantially the same length of curtain down hanging over the area to be curtained as before. The extreme upper edge of the curtain top 19, is finished off adjacent the uppermost rod-engaging passageway, in such a manner, that the edge band (if any) above the uppermost passageway will be self-supporting and remain erect or upstanding when the curtain is hung or otherwise draped to utilize the uppermost passageway only, to effect maximum length adjustment (Figs. 15, 16, 24, 40, 43). The top portion 19 may be wholly or partly utilized to extend the body portion, and when not so utilized, folded and ornamentally displayed as a cuff, heading and/or valance at the top of the curtain, thereby effectively and ornamentally conserving the top portion until such time as it is required for use to effect length adjustment.

The most effective way of hanging the curtains having eyelet passageways is shown in Figs. 6, 9, 13, 14, 15 and 18. Curtains of the desired length and number of eyelet passageways having been selected, the curtain top is folded so that the ornamental bands, 11, 12, and 13 coincide bringing the vertically aligned rows of eyelets 14, 15, and 16, into registry (as shown in Fig. 3), and the curtain rod 17 is then passed through the eyelets (as shown in Fig. 4), and detachably or otherwise, secured to the frame of the window 18. The pleats formed in the curtains are now adjusted to present the sinusoidal appearance throughout the length of the curtain substantially as shown in Fig. 9 of the drawings. The curtains may be hung with cuff in front (Fig. 6) or behind (Fig. 9). If a valance effect is preferred the curtain top 19 may be folded with only the rows of eyelets 15 and 16 in registry, and the curtains hung wide (Fig. 17) or narrowly pleated (Fig. 18). The area covered by the curtains will be the same in Figs. 6, 9 and 18, as the line of suspension is the same. When the curtains are removed from the window and washed in the process of laundering a certain amount of shrinkage takes place. It should be understood that if the curtain is stretched upon a frame to dry, the length of the curtain may be retained at the expense of the width, or vice versa, but this tends to distort the pattern. If the curtain is stretched to maintain both its original length and width the threads are apt to break, particularly where over a period of time stretching is repeated each time the curtain is re-washed after being used, because due to the effect of sunlight and from other causes, the fabric loses its tensile strength after the curtain has been hung for some time. It should also be understood that some fabrics will shink more than others, and that the amount of shrinkage may vary somewhat with different laundering processes. The spacing between two adjacent rows of eyelets is sufficient to compensate for the shrinkage in the first washing, and in some instances the washing process may be repeated before the cumulative shrinkage equals the vertical distance between the lowermost, and the intermediate, rows, of eyelets. Sufficient surplus fabric is provided in the top portion to insure that the curtain is long enough to compensate for the cumulative effect of shrinkage throughout the useful life of the curtain. When the shrinkage due to one or more washings equals the vertical distance between adjacent rows of eyelets, the curtain if re-hung in its original position would appear appreciably shorter. To compensate for and offset this shrinkage, the curtains 10 are now folded so as to expose the lowest ornamental reinforcing band 13 below the curtain rod 17, as shown in Fig. 4, but the ornamental cuff or valance like appearance is still retained, as are the sinusoidally formed pleats. The ornamental effects now obtainable are best illustrated by Figs. 13 and 14, being views of opposite sides of the same curtain. The double, triple (or other), thickness, imparted to the cuff (Figs. 6, 9, 13, 14) by folding the top portion 19, tends to give body to the pleats and to cause them to maintain their sinusoidal appearance. It also facilitates the free sliding movement of the curtains 10 upon the rod 17. When the curtains 10 are hung with the lowest eyelet passageway exposed (Figs. 13, 14 and 30) the eyelets 16 because of their location and the arrangement of the pleats will be substantially concealed in the folds of the curtains, and not conspicuous to the eye of the observer. To still further lengthen the curtain it may be suspended from the uppermost passageway only (Figs. 15 and 16). As each curtain is made as a self contained unitary structure, it is all ready to adjust and hang without the necessity of any cutting, hemming, or stitching, of any kind, thereby effecting a great saving of both time and labor upon the housewife's part. The curtains 10 including the bands 11, 12 and 13 and the rows of eyelets 14, 15 and 16 having been woven on a loom (or otherwise formed in a machine equipped factory) will have true edges, and the eyelets will be accurately and equally spaced, so that when the curtain is hung on the rod 17 it will hang perfectly straight and without sagging. Any preferred color scheme and ornamental effect can be obtained by varying the weave and/or colors employed in the body portion 20 and/or top portion 19, in fact the inventive concept is capable of being given an unlimited variety of expressions, dependent upon the character and degree of ornamentation desired. This is a great improvement over the prior art wherein curtains made to fit a particular window would often shrink and become too short after laundering and unless an excess of material for lengthening and rehemming had been reserved in the original hem fold, the curtains had to be discarded unless made too long originally in order to allow for shrinkage, in which event the curtain due to said excess length was apt to be soiled and damaged. Moreover the ornamental effects capable of being produced by the present invention were previously entirely unknown. The curtains may be used either as panels, or in pairs, or may be arranged in any other preferred manner.

In constructing the adjustable curtains hereinbefore described, either the body portion or the top portion may be formed first as desired so long as in fabricating the curtain the correct proportions of the body portion, and of the top portion including the rod-engaging passageways and the panels or spacings there-between are employed for the particular size and type of curtain in process of manufacture.

What is claimed is:

1. As an article of manufacture a curtain having a body portion and a surplus fabric top portion operable to extend the body portion to effect length adjustment thereof, the portion of said surplus fabric not so utilized being foldable to constitute an ornamental valance, a horizontal row of eyelets positioned at the line of merger of said body and top portions and constituting a rod-engaging eyelet passageway whereon the curtain is slidably suspendable to effect minimum length and desired width adjustment, and the upper marginal edge of the top portion being reversely folded and stitched to form a hem finished top edge for the curtain, said hem being large enough to constitute a second rod-engaging passageway paralleling said eyelet passageway and in spaced relation thereto.

2. As an article of manufacture a curtain having a body portion and a surplus fabric top portion in extension thereof, a horizontal row of eyelets positioned at the line of merger of said body and top portions, and constituting a rod-engaging eyelet passageway, a second row of eyelets formed in said top portion in parallel spaced relation to said first eyelet passageway, corresponding eyelets in each row being vertically aligned, said top portion being reversely horizontally folded midway between said rows of eyelets to bring the two rows of eyelets in cooperative registry to form a common eyelet passageway, and a line of stitches passing through the folded plies of fabric adjacent the free top edge of the top portion to form a hem and to retain said rows of eyelets in cooperative registry, said hem being large enough to constitute an additional rod-engaging passageway for the curtain.

3. As an article of manufacture a curtain having a body portion and a surplus fabric top portion merging with the upper end of the body portion and in extension thereof, a horizontal row of eyelets positioned at the line of merger of said body and top portions and constituting a rod-engaging eyelet passageway, a second and a third row of eyelets, constituting rod-engaging passageways, formed in said top portion in parallel spaced relation to said first eyelet passageway and to each other, corresponding eyelets in each row being vertically aligned, said top portion being reversely folded mid-way between said second and third row of eyelets to bring the vertically aligned eyelets in said second and third rows into cooperative registry to form a common eyelet passageway, and means for securing the folded plies together adjacent the free top edge of the top portion to form a hem and to retain said rows of eyelets in cooperative registry, said hem being large enough to constitute an additional rod-engaging passageway for hanging the curtain.

4. As an article of manufacture a curtain having a body portion and a surplus fabric top portion merging with the upper end of the body portion and in extension thereof, a hemmed horizontally disposed rod-engaging passageway comprising horizontal rows of eyelets formed in the walls of said hem and constituting a common eyelet passageway, said passageways being located at the line of merger of said body and top portions, and a second hemmed rod-engaging passageway also comprising horizontal rows of eyelets formed in the walls of said hem and constituting a common eyelet passageway, said passageway being located adjacent the extreme top edge of the completed curtain and in parallel spaced relation to said first hemmed passageway, the distance between said hemmed passageways measuring generally the shrinkage in the curtain as in washing.

5. As an article of manufacture a curtain having a body portion and a surplus fabric top portion merging with the upper end of the body portion and in extension thereof, a plurality of rod-engaging passageways including a hemmed passageway and a plurality of eyelet passageways formed in said top portion, said passageways being positioned in horizontal parallel spaced relation, the spacings between the said passageways being substantially the same and measuring generally the shrinkage in the curtain as in washing, one of said rod-engaging passageways being located at the line of merger of said body and top portions, and another at the extreme top edge of the completed curtain.

6. As an article of manufacture a curtain having a body portion and a surplus fabric top portion merging with the upper end of the body portion and in extension thereof, a plurality of horizontally disposed rows of eyelets formed in said top portion, each of said rows constituting a rod-engaging passageway for suspending the body portion to effect length adjustment thereof, corresponding eyelets in each row being vertically aligned, the spacing between said rows of aligned eyelets measuring generally the shrinkage of the curtain as in washing, and another horizontal row of eyelets formed in said curtain mid-way between two of said rows of vertically aligned eyelets but is staggered relation thereto.

7. As an article of manufacture a curtain having a body portion and a surplus fabric top portion merging with the upper end of the body portion and in extension thereof, a plurality of horizontally disposed rows of eyelets formed in said top portion, each of said rows constituting a rod-engaging passageway for suspending the body portion to effect length adjustment thereof, corresponding eyelets in each row being vertically aligned, the spacing between said rows of aligned eyelets measuring generally the shrinkage of the curtain as in washing, and a plurality of other horizontally disposed rows of eyelets formed in said top portion, at least one of said rows of eyelets being positioned between two of the rod-engaging passageways first mentioned, each of said second mentioned rows of eyelets also constituting a rod-engaging passageway for suspending the body portion of the curtain, corresponding eyelets in each of said second mentioned rows being vertically aligned relative to each other but staggered relative to the rows of eyelets first mentioned.

8. As an article of manufacture a ready-to-hang adjustable curtain having a body portion and a surplus fabric top portion merging with the upper end of the body portion and in extension thereof, a plurality of horizontal rows of eyelets formed in said top portion constituting rod-engaging eyelet passageways for extending the body portion of the curtain to effect length adjustment thereof, the eyelets in the several rows being relatively staggered and the spacing between said rows measuring generally the shrinkage in said curtain as in washing.

9. As an article of manufacture a ready-to-hang adjustable curtain having a body portion and a surplus fabric top portion merging with the upper end of the body portion and in extension thereof, three or more horizontal rows of eyelets formed in said top portion and constituting rod-engaging eyelet passageways for extending the body portion to effect length adjustment thereof, the first and last eyelets in each row being vertically aligned and positioned relatively close to the side edges of the curtain, a finished top edge positioned relatively close to the uppermost row of eyelets, and a hem formed at the bottom of the body portion and extending horizontally from side edge to side edge thereof.

10. As an article of manufacture an adjustable ready-to-hang curtain, having a body portion and a surplus fabric top portion merging with the upper end of the body portion and in extension thereof, a plurality of rows of eyelets formed in said top portion, each row constituting a rod-engaging eyelet passageway for suspending the curtain, corresponding eyelets in each row being vertically aligned, one of the side edges of the fabric being reversely and vertically folded along a line mid-way between two vertical rows of eyelets to bring the horizontally aligned eyelets contained in the formed fold into unobstructed cooperative registry, and means to secure the free edge of the folded ply to the body of the curtain to form a hem finished side edge having a plurality of pairs of vertically aligned eyelets defining the vertical centre line of said hem.

11. As an article of manufacture a ready-to-hang adjustable curtain having a body portion comprising groups of pillared warp threads constituting a relatively open network fabric, and a surplus fabric top portion merging with the upper end of the body portion by the extension of said pillared threads, said pillars as extended being alternately separated and re-pillared to form a plurality of horizontal bands of relatively finer network each band having a horizontal row of eyelets and panels of relatively open network between said bands, corresponding eyelets in each row being vertically aligned, each of said rows of eyelets constituting a passageway for a curtain rod whereon the curtain is freely slidably suspendable to effect width and length adjustment, the lowermost rod-engaging eyelet passageway positioned adjacent the line of merger of the body and top portions being operable when used as the line of suspension to effect minimum length adjustment, the uppermost rod-engaging eyelet passageway being positioned adjacent the free edge of the top portion and operable when used as the line of suspension to effect maximum length adjustment, the length of fabric between adjacent eyelet passageways measuring generally the shrinkage of the curtain as in washing, and a surplus of fabric, beyond the uppermost rod-engaging passageway, adapted to be fashioned into a finished edge band at the upper extremity of the curtain.

12. As an article of manufacture a ready-to-hang adjustable curtain having a body portion, and a surplus fabric top portion merging with the upper end of the body portion and in extension thereof, a horizontal row of eyelets formed at the line of merger of said body and top portions, said eyelets constituting a rod-engaging passageway for suspending the curtain to effect minimum length adjustment, another horizontal row of eyelets formed in the top portion constituting a second rod-engaging eyelet passageway positioned in parallel spaced relation to said first mentioned passageway, corresponding eyelets in each eyelet passageway being vertically aligned, the distance between said eyelet passageways measuring generally the shrinkage of said curtain as in washing, and a horizontal line of threads, defining the medial line between adjacent eyelet passageways, operable when the top portion is folded to effect length adjustment to bring the vertically aligned eyelets into cooperative registry to form an unbroken top edge for the folded curtain.

13. As an article of manufacture a ready-to-hang adjustable curtain having a body portion, and a surplus fabric top portion merging with the upper end of the body portion and in extension thereof comprising, a plurality of spaced horizontal rows of eyelets constituting rod-engaging passageways whereon the curtain is freely slidably suspendable to effect width and length adjustment, the pattern of the body portion being modified at the line of merger of said body and top portions to fabricate the lowermost row of eyelets in the network thereof, and the pattern of the top portion being otherwise modified to fabricate one or more horizontal bands of relatively fine network containing one or more of said remaining rows of eyelets.

HUGO GELLER.